Aug. 4, 1936.    J. M. CUNNINGHAM    2,049,690

DRIVE MECHANISM

Filed Dec. 5, 1932

INVENTOR-
James M. Cunningham
BY
W. M. Wilson
ATTORNEY-

Patented Aug. 4, 1936

2,049,690

UNITED STATES PATENT OFFICE 2,049,690

DRIVE MECHANISM

James Mason Cunningham, Endicott, N. Y., assignor, by mesne assignments, to International Business Machines Corporation, New York, N. Y., a corporation of New York Application December 5, 1932, Serial No. 645,741

6 Claims. (Cl. 192—28)

This invention relates to an improved drive mechanism particularly suitable for use in accounting, calculating, and like machines.

The primary object of the invention is to provide a simple and reliable drive mechanism which is capable of operating smoothly at high speed.

Another object is to provide a simple and efficient one-revolution clutch which is positive in operation and can be controlled by a small amount of power.

An object is to provide a clutch which is particularly suitable for use in accounting, calculating, and like machines.

A further object is to provide a one-revolution clutch which may be electrically controlled by current impulses emitted by a suitable control device at any point in a cycle previous to the operating cycle of the clutch.

Other objects, advantages, and features of the present invention will be brought out in detail in the following specification and claims, or will be apparent from a study of said specification and claims and the appended drawings.

Figure 2:
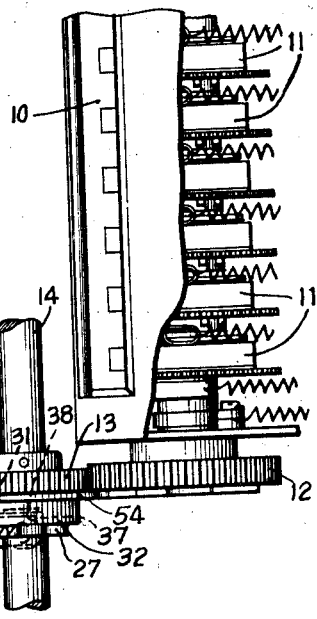
Fig. 2 is a plan view of the clutch mechanism and the associated accumulator.

The numeral 10 (Fig. 2) designates any well known type of accumulator which is reset by imparting a complete revolution to the shaft (not shown) upon which the accumulator wheels 11 are mounted. The accumulator illustrated in the drawing is of the now well-known type disclosed in the patent to Hollerith No. 974,272. Since the details of construction of the accumulator are of no interest in the present case and are familiar to those skilled in the art, it need not be described herein. It will suffice to say that the shaft carrying the accumulator wheels 11 has mounted thereon a gear 12 which, as described in Patent No. 1,600,414, is capable of a slight movement relative to said shaft for the purpose described in said patent. So far as the present invention is concrned, the gear 12 may be considered as if fixed to the shaft carrying the wheels 11. It will be understood that one complete revolution of gear 12 causes the wheels 11 having amounts standing therein to be reset to zero.

The gear 12 meshes with a gear 13 which is loosely mounted on a shaft 14, hereinafter to be termed the resetting shaft, which extends in front of the accumulator 10 and is journaled in suitable bearings (not shown) mounted in the frame of the machine. When the present invention is incorporated in a record controlled machine like that disclosed in Patent No. 1,600,413, for example, the shaft 14 may be common to a plurality of accumulators.

Figure 3:
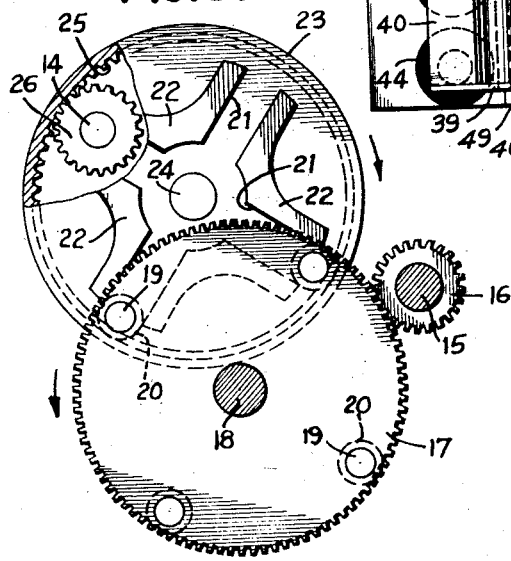
Fig. 3 is an elevation of the driving connections for the resetting shaft.

The shaft 14 is continuously rotated in a clockwise direction (Fig. 1) at a rate of speed varying between minimum and maximum limits through driving connections illustrated in Fig. 3. A shaft 15 is provided which is driven at a substantially uniform rate of speed in a clockwise direction by any suitable means as by a resetting motor or by suitable gearing to the main driving shaft of the machine in which the resetting mechanism is incorporated. A pinion 16, mounted rigidly on shaft 15, meshes with a large gear 17 fixed upon an idler shaft 18 journaled in the framework. The gear 17 has mounted thereon four pins 19 spaced equal distances from each other circumferentially of the gear 17 and equal radial distances from the shaft 18. The pins 19 carry anti-friction rollers 20 which are adapted to ride in grooves or slots 21 formed by four angular ribs or walls 22 projecting from the side of a large disc 23 loosely mounted on a stub shaft 24 carried by the framework of the machine. The disc 23 is provided with internal gear teeth 25 meshing with the teeth of a gear 26 fixed on the resetting shaft 14.

In the embodiment of the invention shown in the drawing the gear ratio between the pinion 16 and gear 17 is 1:4, while the gear ratio between the disc 23 and gear 26 is 4:1. The disc 23 and gear 17 together constitute a Geneva gear drive the driving ratio being unity since there are four pins 19 and four grooves 21. It will be obvious, therefore, that the shaft 14 will make one revolution for each revolution of shaft 15.

Considering the position of the parts in Fig. 3 as a starting point, the disc 23 will be driven in a clockwise direction by one of the pins 19 in gear 17 engaging its co-acting slot in the disc 23. Owing to the fact that the slots 21 are straight while the pins 19 move in a curved path, it is plain that the disc 23 will be started in motion from a position of rest and accelerated in speed as the operative pin 19 moves in the slot in a direction toward the center of shaft 24. The maximum speed of disc 23 will be attained at the point at which the pin 19 reverses its direction of movement relative to the slot 21 which point will be reached when the gear 17 and disc 23 have been turned one eighth of a revolution. Due to the gear ratios between pinion 16, gear 17, disc 23, and gear 26, the maximum speed of disc 23 will be reached when the shafts 14, 15 have both been turned a half revolution.

During the next half revolution of shafts 14, 15 (or an eighth revolution of gear 17 and disc 23), the operative pin 19 retraces its path in the coacting groove 21 during which interval the disc 23 will be turned at a diminishing rate of speed which, of course, becomes zero when the parts again reach the position shown in Fig. 3.

It is clear from the foregoing description that the shaft 14 will always be turned at a variable rate of speed ranging from a minimum speed at one point in its cycle (Fig. 3) to a maximum occurring one-half revolution later. This varying rate of speed permits the accumulator 10 to be reset very quickly yet without shock or danger of overthrow of the parts. In order to drive the accumulator from the shaft 14 for the purpose of resetting the accumulator wheels to zero a novel and improved clutch is provided which is so devised that the driving connection between the accumulator wheels and shaft 14 is effected only when the shaft 14 is momentarily at rest.

Rigidly mounted on shaft 14 is a member 27 having pivoted thereto a driving pawl 28. A spring 29, interposed between the free end of the pawl and the end of member 27 opposite the point at which the pawl is pivoted, normally tends to rock the pawl in a clockwise direction (Fig. 1) to draw the free end of the pawl toward the center of shaft 14 so that a lug 30 formed in the pawl 28 tends to enter a notch 31 in a collar 32 fixed to the gear 13. The pawl 28 is prevented from rocking to effect engagement between lug 30 and notch 31 by means which is effective only at the instant when the shaft 14 is at rest.

The foregoing means comprises a three-armed member 33 pivotally mounted at 34 in a frame 35 fixed to the framework of the machine. One arm 36 of the member 33 carries an anti-friction roller 37 which normally lies in the path of movement of the tail 38 of pawl 28. The parts are so positioned with respect to one another that, as the shaft 14 and member 27 rotate, the roller 37 will engage the tail 38 of pawl 28 and cam the latter in a counterclockwise direction once each revolution of the shaft 14, this action occurring at the time the lug 30 would otherwise enter the notch 31.

Thus, as the shaft 14 rotates the pawl 28 is first released and permitted to ride on the periphery of collar 32 and then, when the lug 30 and notch 31 in said collar are about to come into register, the pawl is rocked an amount sufficient to move the lug 30 out of contact with collar 32 and prevent it from entering the coacting notch, the pawl being subsequently released when the tail 38 thereof has passed out of contact with the roller 37. Since there is only one notch 31 in the sleeve 32 it is obvious that the gear 13 will not be driven by shaft 14 although the pawl is free to move during practically the entire revolution of shaft 14.

In order to connect the shaft 14 to the gear 13 to drive the latter at a varying rate of speed, it is merely necessary to move the arm 36 and anti-friction roller 37 downwardly or in a clockwise direction (Fig. 1) out of the path of the pawl 28. The arm 36 is held in the position shown in Fig. 1 by a latch arm 39 forming part of a bail 40 pivoted at 41 to an upwardly extending part of the frame 35, the latch arm having a hook portion 41a engaging the upper end of the arm 42 of member 33. The latch arm 39 is slightly undercut or notched as at 43 in order to prevent dirt from filling the shallow ledge forming the hook portion and preventing the latch arm from securely holding the end of arm 42. The bail 40 carries an armature co-acting with an electromagnet 44 by means of which the latch arm may be disengaged from the arm 42. The bail 40 also has an arm 45 projecting downwardly and to the right (Fig. 1) which arm has a bent over lug 46 facing but not contacting with the end of an adjusting screw 47 carried by a similar lug 48 in the arm 42. A spring 49, interposed between the end of arm 45 and an arm 50 formed in the member 33, normally holds the latch arm 39 in latching engagement with the upper end of arm 42 as shown in Fig. 1 and also serves to operate the member 33 when the latch arm is released.

The arm 42 is provided with a projection 51 in the path of movement of a lug 52 in a block 53 secured to the side of gear 13. The arm 42 and the lug 51 are offset to prevent possible interference between the lug 52 and the anti-friction roller 37 or between the arm 42 and a block 54, which is secured to gear 13 and has the function described in Patent No. 1,600,414. A pin 55 in the frame 35 serves to limit clockwise movement of member 33 to an extent sufficient to move roller 37 out of the path of pawl 28.

Figure 1:
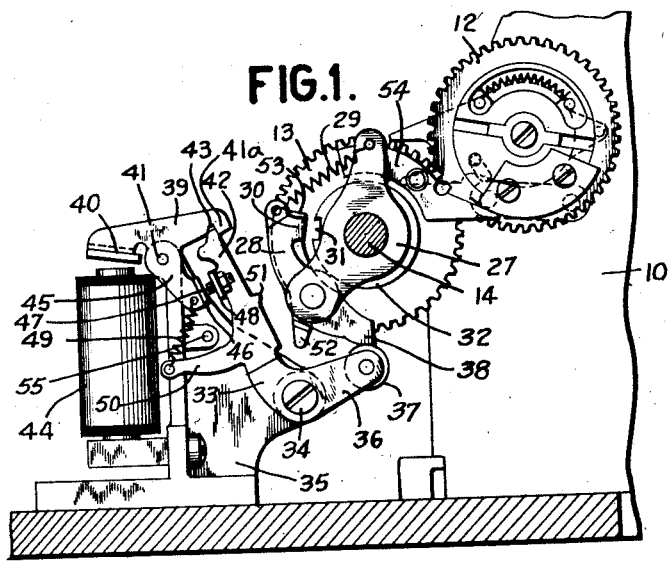
Fig. 1 is a vertical elevation of the clutch mechanism.

During the first few degrees of movement of shaft 14 and member 27 from the position shown in Fig. 1, the tail 38 of pawl 28 will pass out of contact with roller 37 and the lug 30 in the pawl will be brought by spring 29 into contact with the surface of the sleeve 32. The lug 30 will then ride over the surface of collar 32 during substantially the remainder of the movement of shaft 14 back to the position shown in Fig. 1 without effecting drive of the sleeve 32 and gear 13. The magnet 44 may receive a momentary impulse of current at any time during a cycle of rotation of member 27.

Assuming such an impulse of current is received by the magnet 44, the bail 40 will be rocked a slight amount counterclockwise thereby unlatching the arm 42 and permitting the member 33 to rock in a clockwise direction under the influence of spring 49. As a consequence, the roller 37 will be moved downwardly out of the path of the tail 38 of the pawl 28. When the member 27 and shaft 14 again reach the position shown in Fig. 1 the pawl 28 will be free to rock clockwise a further distance under the influence of its spring 29 to carry the lug 30 into the notch 31 in collar 32, this action occurring at the instant when the shaft 14 and member 27 are momentarily at rest as in Fig. 1.

During the next revolution of shaft 14 the latter and gear 13 will be locked together by the pawl 28 and member 27 and the shaft 14 will drive the gears 12, 13 and the shaft carrying the counter wheels at a continually increasing speed, reaching a maximum when the shaft has completed one half a revolution.

The lug 52 will, during the first quarter revolution of shaft 14, engage the arm 42 and rock the latter counterclockwise a distance sufficient to permit relatching of the upper end of said arm by the latch arm 39. After this preliminary movement of arm 42 the lug 52 will strike the projection 51 in arm 42 and impart to the latter a slight additional amount of movement in a counterclockwise direction just sufficient to cause the end of the adjusting screw 47 to strike the lug 46 and rock the arm 45 a slight extent. This causes the bail 40 to rock in a clockwise direction to carry the arm 39 into position to hold the arm 42 when released by the lug 52 and also serves to knock the armature of the magnet 44 free of the poles of the latter thereby preventing the armature from sticking due to residual magnetism and positively insuring that the latch 39 will catch and hold the arm 42.

Thus, during the first quarter revolution of the second revolution of shaft 14 the parts will be relatched and the roller 37 will, of course, be moved back into the path of the tail 38 of pawl 28. Near the end of the second revolution of shaft 14, the tail of the pawl 28 will be cammed in a counterclockwise direction to disengage the lug 30 from the notch 31 in collar 32 and permit the shaft 14 to continue to turn without driving the gear 13. The shaft 14, during the last half of the second revolution, during which interval it is driving the gear 13, will, of course, turn at a diminishing rate of speed which becomes zero at the time the lug 30 becomes disengaged from the notch in the sleeve 32 so that the parts are arrested without shock.

It is clear from the foregoing description, that the accumulator wheels are first moved at an accelerated rate of speed, starting from a condition of rest, reaching a maximum speed at the end of the first half cycle, and then, during the second half of the cycle, moved at a decelerated rate of speed back to a condition of rest at the end of the cycle. The accumulator may thus be reset at a high rate of speed without danger of pounding or excessive vibration which would cause excessive wear and uncertainty of operation if permitted to exist. Since the latch arm 39 requires little force to release, the magnet 44 need not be very powerful and will consume a negligible amount of current both on account of its small size and the fact that only a momentary impulse of current is required for operation of the latch arm. It is clear that the magnet 44 may be tripped at any time in practically an entire cycle prior to the cycle in which the accumulator is to be reset and does not require the use of auxiliary circuits to hold the clutch engaged a sufficient length of time as was formerly the case.

The present invention has been disclosed in a specific form of embodiment and as applied to a particular type of accumulator solely for convenience in description. However, it is to be understood that the invention is not limited to the specific embodiment and type of accumulator disclosed as variations may be made in the structure as occasion requires or different types of accumulator may be co-ordinated with the invention, all such variations and co-ordinations falling within the scope of the appended claims.

I claim:

1. In combination, a shaft, an arm secured to the shaft and acting as a driving element, a driven element loose on the shaft adjacent the arm and having a recess, a clutch interponent pivoted on said arm and having a projection adapted to enter said recess, means normally urging said interponent in a direction to cause said projection to enter said recess whereby the interponent normally tends to couple the arm and driven element together once during each revolution of the shaft, said driven element normally occupying a position of rest such that the projection tends to enter the recess during each revolution of the driving element; a fixed support, a lever pivoted on said support and having a roller in a position to engage said interponent during each revolution of said arm to prevent the projection from entering said recess, means for rocking the lever to withdraw the roller from its interponent engaging position, and releasable means for holding the lever with the roller in interponent engaging position.

2. In combination, a constantly rotating shaft, a driving element fixed to the shaft to rotate therewith, a driven element loosely mounted on the shaft and normally at rest, a clutch interponent carried by the driving element, means for urging the interponent into engagement with the driven element to establish a positive driving connection between the driving and driven elements, an operating element adapted to be projected into the path of movement of the interponent to periodically prevent engagement between the interponent and driven element and thereby prevent driving of the driven element by the driving element, and means for operating said operating element including a releasable latch for holding the operating element in the path of movement of the interponent, means for withdrawing the operating element from the path of movement of the interponent when the latch is released, and means for releasing the latch.

3. In combination, a constantly rotating shaft, a driving element fixed to the shaft to rotate therewith, a driven element loosely mounted on the shaft and normally at rest, a clutch interponent carried by the driving element, means for urging the interponent into engagement with the driven element for establishing a positive driving connection between the driving and driven elements, an operating element adapted to be projected into the path of movement of the interponent and having the effect of periodically preventing engagement between the interponent and driven element and thereby preventing driving of the driven element by the driving element, and means for controlling said operating element comprising a spring normally tending to withdraw the operating element from the path of the interponent, and a releasable latch for holding the operating element in the path of the interponent, said operating element when unlatched being engageable by the driven element during a part of its revolution to restore the operating element to latching position.

4. A clutch device comprising rotatable driving and driven elements, a clutch pawl carried by the driving element and adapted to engage a notch in the driven element, a spring normally urging the clutch pawl into engagement with the driven element whereby the pawl rides on the driven element until said pawl engages the notch and thereby establishes a positive driving connection between said elements, a clutch control lever adapted to be projected into the path of the pawl to cam it away from the notch during each revolution of the driving element whereby to prevent a driving connection from being established between said elements, means on the driven element to project the control lever into the path of the pawl, means to hold the control lever in the path of the pawl, and means to release the holding means.

5. In combination, a drive shaft, a driving element secured to said shaft; a driven element loosely mounted on said shaft and having an abutment, said driven element being normally at rest; a radially movable clutch interponent carried by the driving element, means for urging the interponent radially into engagement with the abutment in the driven element to establish a positive driving connection between the driving and driven elements, an operating element having a cam arm rockable into the path of the interponent whereby to periodically prevent said interponent from moving radially into engagement with said abutment; and means for actuating said operating element to move the cam arm into and out of the path of said interponent including means to withdraw said cam arm from the path of the interponent, means to prevent withdrawal of said arm by said withdrawing means, and means to release the preventing means.

6. In combination, a driving element, a driven element normally at rest and having an abutment, a radially movable clutch interponent carried by said driving element, means for moving the clutch interponent radially into engagement with said abutment to establish a positive driving connection between said elements, an operating element having a cam portion adapted, when the operating element is in one position to clear said interponent and permit engagement of said interponent with said abutment, and when in another position to cam the interponent out of engagement with said abutment, a latch for holding said operating element in one of its positions, means for moving the operating element to the other of its positions when the latch is released, and a magnet for releasing the latch.

JAMES MASON CUNNINGHAM.